US006938004B1

(12) United States Patent
McIntyre

(10) Patent No.: US 6,938,004 B1
(45) Date of Patent: Aug. 30, 2005

(54) METHOD OF PROVIDING PHOTOFINISHING CREDIT

(75) Inventor: Dale F. McIntyre, Honeoye, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/533,212

(22) Filed: Mar. 23, 2000

(51) Int. Cl.[7] ............................................. G06F 17/60
(52) U.S. Cl. ......................... 705/27; 396/95; 396/133; 396/287; 396/318; 705/26
(58) Field of Search ...................... 705/26, 27; 396/95, 396/287, 133, 318

(56) References Cited

U.S. PATENT DOCUMENTS

| | | | |
|---|---|---|---|
| 4,239,384 A | 12/1980 | Treiber | |
| 4,651,199 A | 3/1987 | Alkofer | |
| 4,679,150 A | 7/1987 | Hayashi et al. | |
| 4,896,791 A | 1/1990 | Smith | |
| 4,910,682 A | 3/1990 | Wolff et al. | |
| 5,173,851 A | 12/1992 | Off et al. | |
| 5,483,444 A | 1/1996 | Heintzeman et al. | |
| 5,648,906 A * | 7/1997 | Amirpanahi | 705/418 |
| 5,692,834 A * | 12/1997 | Pagano | 383/9 |
| 5,806,045 A | 9/1998 | Biorge et al. | |
| 5,923,016 A | 7/1999 | Fredregill et al. | |
| 5,924,080 A | 7/1999 | Johnson | |
| 6,324,521 B1 * | 11/2001 | Shiota et al. | 705/27 |

OTHER PUBLICATIONS

Supermarket News, "Kroger Deals Out Frequent Photo Card," Apr. 15, 1996, p51, Dialog file 16 #04301832.*
Supermarket News, "Retailers Getting Into The Holiday Spirit," Oct. 15, 1990, p32, Dialog file 16 #01361466.*
Supermarket News, "Advancing The Film," Oct. 2, 1995, v45n40p33+, Dialog file 9 #01299348.*

* cited by examiner

Primary Examiner—Wynn W. Goggins
Assistant Examiner—Pond
(74) Attorney, Agent, or Firm—Frank Pincelli

(57) ABSTRACT

A management system and method of assigning credit for unprintable images provided by a customer. When unprintable frames are submitted for processing, such as scanning, printing or storage, the method allows the photofinisher to keep track of the number of image submitted for processing and assigns credit for to the customer's account for unprintable images. As an example of redeeming such credit, when the number of unprintable images equals a pre-set criterion, such as the number of frames in a roll, a free roll of film could be issued to the customer.

15 Claims, 2 Drawing Sheets

METHOD OF PROVIDING PHOTOFINISHING CREDIT

FIELD OF THE INVENTION

This invention is in the field of photographic processing services and, more particularly, is in the field of methods of accumulating credits to a customer's photofinishing loyalty account.

BACKGROUND OF THE INVENTION

It is well known in commerce in general, and in the photofinishing service business in particular as well, to provide incentives to customers to continue use of a particular product or service. These incentives may include, for example, discount coupons or volume discounts. A well-known example of an incentive specific to the photofinishing service business is the practice by some service providers of providing a replacement "free roll of film" to the customer for every roll submitted for processing.

There is another practice, perhaps unique to the photofinishing business, which also serves to create customer satisfaction and loyalty. In a traditional photofinishing service operation, customers are ordinarily assessed a flat rate charge for processing a roll of film (the charge will, however, often depend upon the length of the roll submitted) and then an additional charge for each print made from that roll is added on to the charges for the order. Most photofinishers today can detect if a frame of the film submitted for processing is blank (e.g., the frame either has no exposure on it at all, or an overall uniform maximum exposure) and not make a print from blank frames. In some operations, more sophisticated automatic detection means may be applied to detect frames which, while not blank or uniformly fogged, are otherwise unprintable or judged unlikely to make a print the customer would want to have. Thus prints will be made only from those prints judged likely to give good results and the total resulting charges for the photofinishing order then will reflect only the prints actually made. This policy of not making prints from unprintable frames undoubtedly leads to greater customer satisfaction with the photofinishing service received.

A problem not fully addressed by this practice is one which arises from the fact that rolls of film are ordinarily supplied in specific roll lengths, containing fixed numbers of exposures. For example, rolls of 12, 24 or 36 exposures are fairly typical. Often, a user of the film may find there are exposures remaining even though all the photographs desired of a particular event have been made. Confronted by this situation and not wishing to "waste" what is perceived by the user as a valuable resource (in this case unexposed film), the user may resort to a practice of shooting photographs, which may also not be of particular interest at the time. Multiple photographs of the same subject such as a family pet, shot hastily, is a familiar example of this practice. While the customer perhaps realizes she would not have to pay for prints made from blank frames, she nevertheless still views submitting the unexposed frames for processing as wasteful.

More recently cameras have been introduced such as the Kodak Preview™ camera, part of the Advantix™ line of cameras, which while employing film as the capture medium, also captures the image photographed electronically and displays a preview image on an LCD screen on the back of the camera. The photographer is then given a choice to select from the options at photofinishing to order one print from the frame, multiple prints from the frame, or no print at all. In the Kodak Preview™ camera, the instructions to the photofinisher are written to the magnetic recording tracks present on the film. In the instance of a frame where no print is selected, this frame is of course wasted and may not be reused.

With the advent of loyalty accounts and computer-stored databases of customer past purchases and preferences, it is now possible for a photofinishing service provider to set up a photofinishing account for each customer and track total actual usage of photofinishing products and services over time. This capability opens the possibility to provide a method to better address the particular problems described above and thereby to engender even greater satisfaction and loyalty to the provider.

SUMMARY OF THE INVENTION

The present invention provides a solution to the problem outlined above by providing a method of assigning credit for unprintable or unused frames of film to a customer's photofinishing loyalty account. When unexposed or otherwise unprintable frames are submitted for processing, the method allows the photofinisher to keep track of the number of frames submitted but not printed and assigns credit for them to the account. As an example of redeeming such credit, when the number of unprinted frames equals a pre-set criterion, such as the number of frames in a roll, a free roll of film could be issued to the customer. Other forms of credit such as reduction of the photofinishing service charge may also be used.

In practice, the photofinishing service provider sets up a loyalty account for a particular customer and assigns a unique ID number to that account. When the customer submits a new photofinishing order, the ID number is associated with the order for example, either by entry on a photofinishing service request bag, or by swiping a card programmed with the ID number at a kiosk.

In accordance with one aspect of the present invention there is provided a photoprocessing management system for managing photoprocessing services of a service provide for filling image orders with resect to rolls of photographic film submitted by a customer, comprising:

a) a computer for processing data by a service provider with respect to the customer, the customer maintaining a customer account with respect to image orders submitted by the customer with respect to the rolls of photographic film;

b) means for filling the image orders for the customer and associating a charge to the customer for filling of the image order with respect to each of the rolls of photographic film submitted by the customer; and c) means on the computer for automatically assigning credit to the customer account for unused or unusable images on the rolls of photographic film submitted by the customer wherein a number of accrued unused or unusable images compared to a threshold value.

In accordance with, another aspect of the present invention there is provided a method for processing images on a plurality of image retaining devices submitted by a customer, comprising the steps of:

a. providing the image retaining devices by the customer, each of the image retaining devices capable of retaining a predetermined number of images;

b. processing the image retaining devices by a processing lab;

c. automatically determining the number of unused or usable images on each of the processed image retaining devices;
d. maintaining a customer account on a computer database with respect to the plurality of image retaining devices; and
e. automatically crediting the customer account for the unused or unusable images in accordance with a predetermined criteria wherein the predetermined criteria comprises comparing the number of images of the image retaining device that said image retaining device was designed to capture with the number of unused or unusable images on each of the processed image retaining devices.

In accordance with still another aspect of the present invention there is provided a computer software product for use in filling, image orders with respect to images on an image retaining device, the computer software product being stored on a computer readable medium having stored instructions which when executed by a computer causes the computer to perform the steps of:
a processing data for a service provider with respect to a customer;
b. tracking and storing the customer orders having an image retaining device capable of retaining a predetermined number of images;
c. automatically determining the number of unused or unusable images on each of the processed image retaining devices; and
d. automatically crediting the customer account for the unused or unusable images in accordance with a predetermined criteria wherein the predetermined criteria comprises comparing the number of images of the image retaining device that said image retaining device was designed to capture with the number of unused or unusable images on each of the processed image retaining devices.

The above, and other objects, advantages and novel features of the present invention will become more apparent from the accompanying detailed description thereof when considered in conjunction with the following drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

The present description will be directed in particular to elements forming part of, or in cooperation more directly with, the apparatus in accordance with the present invention. It is understood that elements not specifically shown or described may take various forms well known to those skilled in the art.

Figure 1:
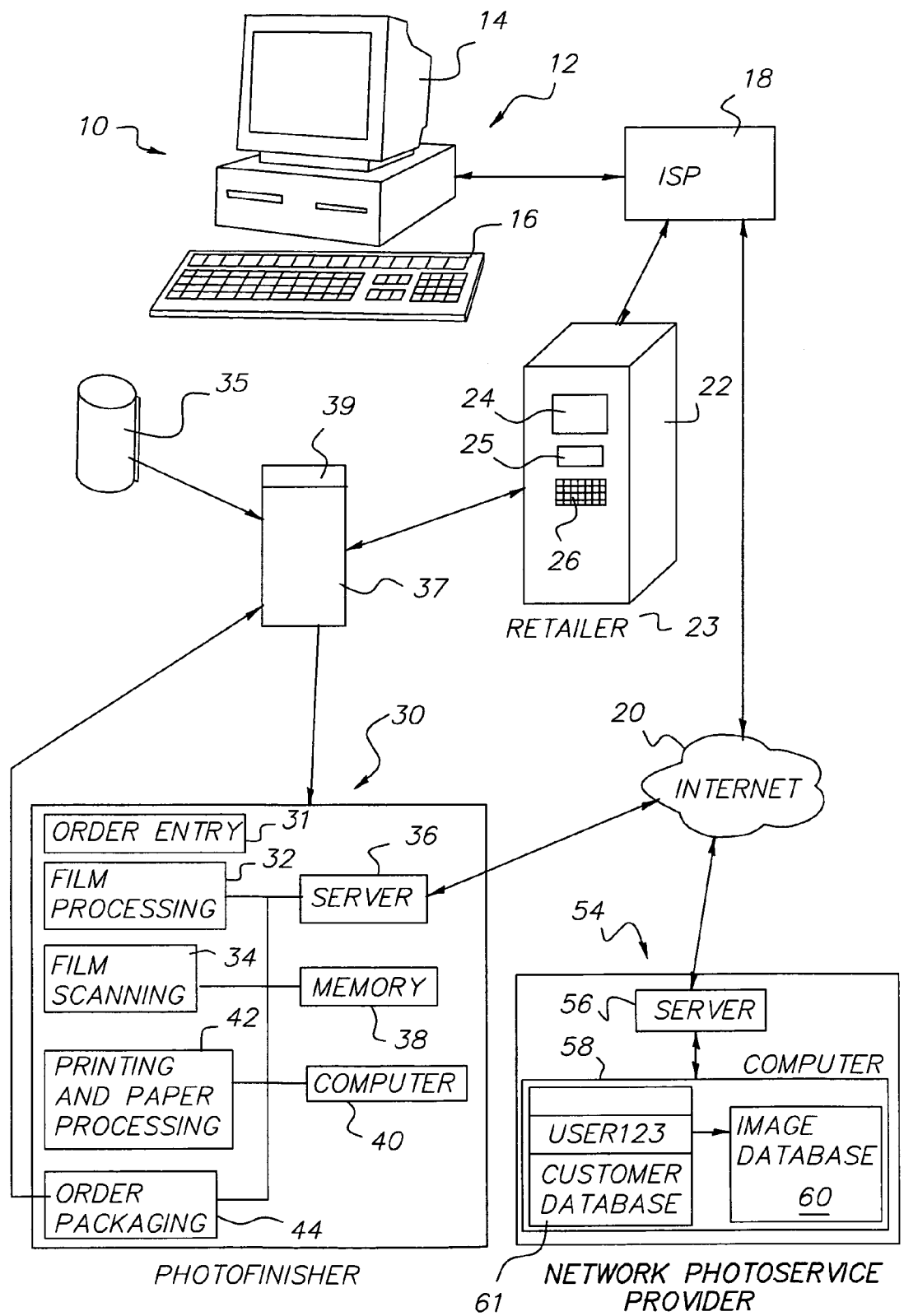
FIG. 1 is a schematic diagram of a image management system made in accordance with the present invention.

Referring to FIG. 1, there is illustrated a schematic diagram of a system 10 made in accordance with the present invention. The system 10 includes a personal computer 12 having a display device 14 and a keyboard 16 for entering data into computer 12. The display device 14 may be of any particular type. In the particular embodiment illustrated the display device is a CRT. Personal computer 12 is provided with appropriate communication hardware and software so as to enable the personal computer 12 to be connected to an internet service provider (ISP) 18. The ISP 18 provides access to the Internet 20.

The system 10 may also include a kiosk 22 or other retail computer located a retailer 23. The kiosk 22 will include a display device 24 and data entry means 26. In the particular embodiment illustrated, data entry means 26 is a keyboard. It is, of course, understood that the data entry means may be of any appropriate type device, for example, but not by limitation may be a touch display screen or a mouse for controlling a selection icon on the display device 24. In addition a card reader 25 may be provided for reading information from a credit card or loyalty card, for example, information on a magnetic strip provided on the card. Other type reading devices such as a bar-code reader may also be provided for reading of information.

The system 10 includes means for filling an image order, which in the embodiment illustrated comprises a photofinishing lab 30 (photofinishing provider) which provides various photofinishing goods and services. For example, the photofinishing lab 30 typically will receive exposed unprocessed photographic film for processing and printing of photographic prints. The photofinishing lab 30 may provide various other image related products such as photo albums, t-shits and mugs having personalized images thereon. There is virtually no limit as to the number and different type of image goods or services that may be provided by the photofinishing lab 30.

A typical photofinishing lab 30 will include various different sections. In the particular embodiment illustrated the photofinishing lab 30 includes an order entry station 31. As is typical in such photofinishing labs, the order entry station 31 includes a splice apparatus for splicing together a plurality of individual rolls of film, each one being associated with a single photofinishing order for a particular customer. Between adjacent rolls and connecting the individual rolls there is provided a splice tape which subsequently allows the forming of a single long roll of film that will processed and printed. The splice tape has a unique machine readable identification number associated with the customer order. Typically this ID number is also printed on the order envelope in which the order was provided. The unique splice number is capable of being tracked through out the photofinishing process and read by various pieces of equipment in the photofinishing process such as a scanner and/or printer. The splice apparatus is also capable of identifying the number of exposures (frames) the roll of film was designed to capture.

The photofinishing lab 30 also included a film processing section 32 wherein exposed undeveloped film is processed. A film scanning section 34 is also provided for scanning the processed film so as to obtain a digital record of the images thereon. The scanning section 34 includes a CCD or other scanning device for electronically capturing the images on the film. Appropriate computer algorithms analyze the digitally captured images to determine which are suitable for printing. The images suitable for printing obtained from the film are forwarded to a computer server 36 or memory storage device 38. A computer 40 is also provided at the photofinishing lab 30 for controlling and monitoring of the photofinishing processes being conducted. The digitally captured images are then sent on to a printer and processing section 42 where the images may be digitally printed and developed. Optionally the images may be forwarded on to an optical printer for optically printing of the images. In such a case, the film may be scanned by a CCD, which is typically used to determine the appropriate printing conditions, to determine what images are suitable for printing. Here again, the CCD can be used to determine the number of images developed on the film that are suitable for printing. The completed order is then packaged at an order packaging station 44 and returned to the retailer 23 that forwarded the order.

In the particular embodiment illustrated, the exposed photographic film is provided to photofinishing lab 30 in a cassette 35 which is placed into an order envelope 37 typically provided at a retailer 23. The order envelope 37 is appropriately filled out by the customer, submitted by the retailer 23, and forwarded by the retailer 23 to the photofinishing lab 30 for obtaining the appropriate service which in the particular embodiment illustrated is for the obtainment of photographic prints. A tear off strip 39 is taken off the order envelope 37 by the customer as a receipt for the order. The tear off strip 39 includes a copy of the envelope ID provided on the envelope that is forwarded to the photofinishing lab 30.

The system 10 further includes a network photo service provider 54 wherein digital images obtained from the scanner section 34 at a photofinishing lab 30 may be stored. In a similar fashion, the network photo service provider 54 receives digital images over the internet 20 via personal computer 12 connected to ISP 18.

The network photo service provider 54 includes a server 56 which is used to communicate with the Internet 20. In the embodiment illustrated, the network photo service provider 54 is ia communication with photofinishing lab 30 through Internet 20. The internet 20 also allows communication between any of the various parties connected thereto, for example, the customer at home, the retailer 23, the photofinishing lab 30, and network photo service provider 54. A computer 58 is also provided at the network photo service provider 54. Computer 58 is in communication with server 56 and includes an image database 60 which stores digital images, and a customer database 61 for identifying the digital images stored in the image database 60. Appropriate computer software on computer 58 provides means for automatically assigning credit to the customer account for unused or unusable images on the rolls of photographic film submitted by the customer wherein a number of accrued unused or unuasable images are compared to a threshold value. In the system 10 illustrated, the network photo service provider 54 is shown separate from the photofinishing lab 30. However, the network photo service provider 54 and photofinishing lab 30 may be at a single operation at the same location. In such case, server 56 may be in direct communication with server 36 or may even be the same server.

Figure 2:
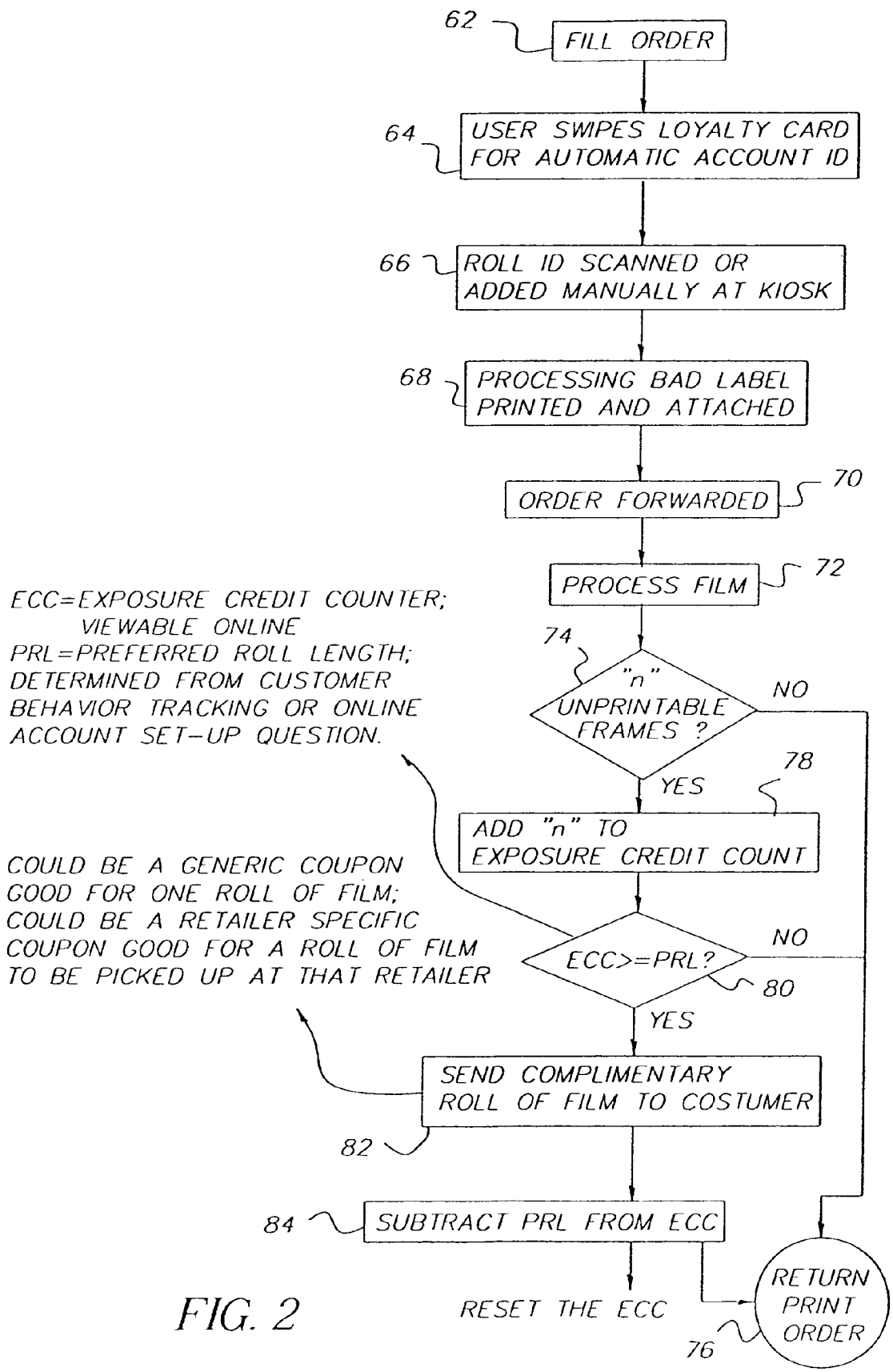
FIG. 2 is a flow chart of operation of the image management system of system of FIG. 1.

Referring to FIG. 2, there is illustrated a process flow diagram for the system 10 of the present invention. The first step 62 occurs when a customer fills out an order envelope 37 for ordering a photofinishing service. The customer provides the appropriate information, for example, name, address and e-mail address. In a typical order, the customer would place the item to be processed within the order envelope 37 and placed in a drop box or is handed over to the retailer for forwarding to the photofinishing lab 30 for processing. In the embodiment illustrated the item to be processed is a roll of photographic film contained in a film cartridge 35. However, the item being forward for processing may comprise film negatives, prints, digital memory devices containing digital images, or other items that can be used for obtaining a variety of goods or services.

Optionally, a customer order kiosk 22 may be provided for placing of the customer order. In such case at step 64, a customer loyalty card may be swiped into card reader 25 on the kiosk 22 for identifying the customer with the order envelope being used. The customer can provide all of the order information into the kiosk 22. At step 66, the roll ID may be scanned for identifying source of image. When the customer finishes entry of the order a label is printed for placement on the enveloped and is placed on the order envelope by the customer at step 68. Such a kiosk 22 is described in two co-pending applications Ser. No. 09/492,062 entitled Method and Apparatus for Ordering Photofinishing Goods and/or services filed on Jan. 27, 2000, by Neil A Ramquist et al., now abandoned, and Method and Apparatus for Ordering Photofinishing Goods and/or services application Ser. No. 09/492,063 filed on Jan. 27, 2000, by Frank Nardozzi et al. now U.S. Pat. No. 6,686,837.

The completed order envelope 37 with the item to be processed enclosed at step 70 is forwarded on to the photofinishing lab 30. During initial processing, the photofinishing lab 30 enters the appropriate information at order station 31 regarding the order received into computer 40, for example, name, address, e-mail address, customer ID, order envelope, etc. Additionally other order information can be automatically obtained from information on the film and/or film cartridge such as the type of film that is to be developed and the number of images the roll of film was designed to capture. The information regarding the film type may used for enhancing the captured image at a later stage in the processing. The number of images that the roll of film was designed to capture will be used as later described herein. Appropriate information is then sent from the photofinishing lab 30 to the network photo service provider 54 such as the customer identification data. The network photo service provider 54 takes the information received from the photofinishing lab 30 and stores the digital images in the image database 60 and customer information in the customer database 61. The order is processed by the photofinishing lab 30 at step 72. For example, if a roll of photographic film is being sent for processing, the film is processed as is customarily done and in accordance with the customer order instructions. In the photofinishing lab 30 after the images on the film have been developed, they are digitally scanned, for example by a CCD linear array, whereby the images developed thereon can be captured. In addition to capturing the images, the images can be analyzed by appropriate algorithms for obtaining various information. In the particular embodiment illustrated the photofinishing lab 30 at step 74 analyzes the images to determine which images are suitable for printing. If thee are no unprintable images, the film is sent on to the printer where the images are printed and returned to the customer at step 76. In the particular embodiment illustrated the images on the film are analyzed to determined if sufficient light is present in the image so as to produce a reasonable quality print. It is to be understood the images can analyzed for any desired predetermined criteria. In determining if an image is suitable for printing various appropriate algorithms may be used. For example, U.S. Pat. No. 4,239,384 by H. Treiber, published Dec. 16, 1980 and herein incorporated by reference, discloses a method useful in a scanning printer to automatically detect and reject from printing frames unprintable by virtue of under- or overexposure. Also, commonly assigned U.S. Pat. No. 4,651,199 by J. Alkofer discloses a method to detect and reject from printing blank frames, either of the "no exposure" or "maximum exposure" type. Both of these patents are hereby incorporated by reference. Additionally, appropriate algorithms may be provided for adjusting the image so that the images forwarded to the customer are illustrated in their best possible form. Once the number of unprintable frames for the roll of film being developed is determined, the number of unprintable frames is credited to the customer's account at step 78. For example, this information is passed on to the customer database 61. The total number of unprintable images that result from a particular customer is kept track of at database 61. This crediting of the customer account is updated for each roll of film forwarded to the photofinishing lab 30 over time. When the number of credited unprintable frames reaches a predetermined criteria, a token is provided for that customer. For example, at step 80 when the number of unprintable frames reaches the number of frames on a roll of film that would hold 24 images, a complimentary roll of film or equivalent coupon would authorized for sending to the customer by the network photo service provider 54. It is, of course, understood that the token may comprise any appropriate premium that the photofinishing lab 30 may select and is not limited to providing a roll of film or coupon. At step 82, the token would be sent to the customer. The credit account at the photo service provider 54 for that customer is reset by removing the credit equivalent to the number of frames in the roll of film sent to the customer at step 84. This could result in the credit account returning to zero or near zero depending upon the number of unprintable frames in the customers most recently processed order. The completed order is sent to the customer which would preferably have the token enclosed there with.

While the embodiment described above is particularly well suited to processing, scanning and printing of film, the present invention is not so limited. For example, but not by way of limitation, the present invention can be applied to the digital scanning of images and/or storing of digital images. A charge could be assessed to a customer for the digital scanning of hard copy images and/or the storage of digital images to a specific customer account. This storage may be for a short period of time or for an extended long period of time in a digital memory storage device. If it is determined that the scanned image or the digital image received from a customer for storage is not suitable (unused or unusable) for printing, credit could be credited to the customer account. For example, for free addition scanning of hard copy images and/or the free storage of additional digital images for a predetermined period of time. It is of course understood that any type credit may provided to the customer and any desired criteria may be used in determining when a credit will be given to the customer.

The invention has been described in detail with particular reference to certain preferred embodiments thereof, but it will be understood that variations and modifications can be effected within the spirit and scope of the invention.

What is claimed is:

1. A photoprocessing management system for managing photoprocessing services of a service provider for filling image orders with respect to rolls of photographic film submitted by a customer, comprising:
   a. a computer for processing data by the service provider with respect to said customer, said computer maintaining a customer account with respect to image orders submitted by said customer with respect to said rolls of photographic film;
   b. means for filling said image orders for said customer and associating a charge to said customer for filling of said image order with respect to each of said rolls of photographic film submitted by said customer; and
   c. means on said computer for automatically assigning credit to said customer account for unused or unusable images on said rolls of photographic film submitted by said customer wherein a number of accrued unused or unusable images are compared to a threshold value.

2. A photoprocessing management system according to claim 1 wherein said automatically assigned credit on behalf of said customer is updated by said computer for each of a plurality of said image orders.

3. A photoprocessing management system according to claim 1 wherein said means for filling said image orders comprises a printer for printing of images on a roll of photographic film.

4. A photoprocessing management system according to claim 1 further comprising a scanner for scanning of images on said roll of photographic film.

5. A photoprocessing management system according to claim 1 wherein said means for filling said image orders comprises the storage of images in a memory storage device.

6. A photoprocessing management system according to claim 1 wherein said means for automatically assigning credit includes scanning the images on a roll of photographic film.

7. A photoprocessing management system according to claim 1 wherein said threshold value is equal to the number of images on a roll of photographic film of a predetermined value and said credit comprises providing said customer a roll of film upon reaching said threshold value.

8. A method for processing images on a plurality of image retaining devices submitted by a customer, comprising the steps of:
   a. providing said image retaining devices by said customer, each of said image retaining devices capable of retaining a predetermined number of images;
   b. processing said image retaining devices by a processing lab;
   c. automatically determining the number of unused or unusable images on each of said processed image retaining devices;
   d. maintaining a customer account on a computer database with respect to said plurality of image retaining devices; and
   e. automatically crediting said customer account for said unused or unusable images in accordance with a predetermined criteria wherein said predetermined criteria comprises comparing the number of images of said image retaining device that said image retaining device was designed to capture with the number of unused or unusable images on each of said processed image retaining devices.

9. A method according to claim 8 wherein said predetermined criteria comprises comparing the number of images said image retaining device was designed to capture with the number of unused or unusable images on said processed image retaining device.

10. A method according to claim 8 wherein said credit comprises keeping track as to the number of images that are unused or unusable to said customer for said image retaining devices that are sent to said processing lab and forwarding to said customer a token when a predetermined credit criteria is reached.

11. A method according to claim 10 wherein said predetermined credit criteria comprises reaching a predetermined number of unused or unusable image frames.

12. A method according to claim 11 wherein said token comprises sending said customer a roll of photographic film.

13. A method according to claim 12 wherein said roll of photographic film contains the same number of image frames as the number of accrued unused or unusable image frames.

14. A method according to claim 11 wherein said token comprises sending said customer a coupon toward the purchase of a product.

15. A computer software product for use in filling image orders with respect to images on an image retaining device, the computer software product being stored on a computer readable medium having stored instructions which, when executed by a computer, causes the computer to perform the steps of:

a. processing data for a service provider with respect to a customer;

b. tracking and storing said customer orders having an image retaining device capable of retaining a predetermined number of images;

c. automatically determining the number of unused or unusable images on each of said processed image retaining devices; and d. automatically crediting said customer account for said unused or unusable images in accordance with a predetermined criteria wherein said predetermined criteria comprises comparing the number of images of said image retaining device that said image retaining device was designed to capture with the number of unused or unusable images on each of said processed image retaining devices.

* * * * *